Patented Nov. 10, 1953

2,658,928

UNITED STATES PATENT OFFICE 2,658,928

METHOD OF MAKING FLUOROCARBON CHLORIDES AND BROMIDES BY THERMAL CHLORINATION AND BROMINATION OF FLUOROCARBON HYDRIDES

Joseph H. Simons, Thomas J. Brice and Wilbur H. Pearlson, State College, Pa., assignors to Minnesota Mining & Manufacturing Company, St. Paul, Minn., a corporation of Delaware No Drawing. Application March 31, 1947, Serial No. 738,504

9 Claims. (Cl. 260—653)

This invention relates to a method of making saturated fluorocarbon chlorides and bromides, containing one or two atoms of chlorine or bromine per molecule and otherwise containing only carbon and fluorine. It also relates to a novel class of compounds which can be made by this method, namely, the saturated polycarbon fluorocarbon monobromides, which contain one bromine atom and at least two carbon atoms per molecule.

We have discovered that it is possible to prepare saturated fluorocarbon chlorides and bromides, containing one or two atoms of chlorine or bromine per molecule, by direct thermal chlorination and bromination of the corresponding saturated fluorocarbon monohydrides and dihydrides, containing one or two atoms of hydrogen per molecule, whereby the hydrogen atoms are replaced by chlorine or bromine.

The starting compounds are of the fluorocarbon type, as distinguished from partially fluorinated hydrocarbons wherein the number of fluorine atoms does not exceed the number of carbon atoms or there are one or more carbon atoms to which no fluorine atoms are bonded. Our fluorocarbon starting compounds are characterized by a relatively high degree of chemical inertness and thermal stability owing to the dominating influence of the fluorine atoms in the molecules. This makes difficult the replacement of the one or two hydrogen atoms present so as to obtain a good yield of the corresponding fluorocarbon chloride or bromide compound having the same number of carbon atoms as the starting compound.

Compounds consisting only of carbon, fluorine and one or two atoms of hydrogen per molecule are the usual starting materials, and are what is meant by the terms "fluorocarbon monohydrides" and "fluorocarbon dihydrides." However, a partially chlorinated or brominated fluorocarbon compound, formed in the operation of the process can be recycled, or separately processed, for further chlorination or bromination. In such compounds one of the two hydrogen atoms of a dihydride has been replaced by chlorine or bromine. Also, a partially chlorinated product might thereafter be brominated, for example. These partially chlorinated and brominated compounds can also be obtained from some other source and used in the present process.

The generic class of starting compounds embraces saturated ring compounds, and saturated chain compounds which include saturated rings, as well as open-chain aliphatic compounds. The class consists of saturated fluorocarbon monohydrides and dihydrides (containing only carbon, fluorine and hydrogen) and partially chlorinated and brominated derivatives; wherein the molecule contains one or two replaceable hydrogen atoms and the number of fluorine atoms exceeds the number of carbon atoms with at least one fluorine atom bonded to each carbon atom. Illustrative examples are $CF_3H$, $C_2F_5H$, $C_3F_7H$, $C_3F_6H_2$, and the partially brominated derivative of the latter, $C_3F_6HBr$, to which specific references are hereinafter made in the examples.

We have discovered that it is possible to heat a gaseous mixture of such a starting compound and chlorine or bromine at a high order of temperature at which efficient thermal replacement of hydrogen occurs, so as to obtain good yields of the corresponding fluorocarbon chloride or bromide, having the same number of carbon atoms as the starting compound. At substantially lower and higher temperatures the discovered result is not efficiently obtained. At lower temperatures, thermal replacement of hydrogen by chlorine or bromine does not take place effectively, owing to the chemical inertness of the starting compound. At higher temperatures the chlorine or bromine causes substantial chlorinolysis or brominolysis of polycarbon starting compounds, involving cleavage of carbon-carbon bonds (as described in our Patent No. 2,506,652). Even in the case where $CF_3H$ (fluoroform) is the starting compound, the use of higher orders of temperature causes difficulties and the proportion of side reaction products is materially increased. In other words, we have discovered that an effective thermal replacement reaction temperature range exists which is quite high by ordinary standards and yet is not so high as to render the desired process ineffective or inefficient.

A feature of the present method is its simplicity. An illustrative procedure consists in passing a gaseous mixture of the starting compound, and chlorine or bromine, through a tube which is heated by a furnace to a temperature of the order of 500–600° C., and separating the desired product from the reaction mixture, as by fractional distillation. Thus, for example, a mixture of $C_3F_7H$ and bromine reacts to yield $C_3F_7Br$ by replacement of the hydrogen. "Pyrex" glass tube can be used as the reaction chamber. Yields of the order of 90% can be obtained. This method has previously been described by us in the Journal of the American Chemical Society, vol. 68, pp. 968–969 (June 1946).

Certain fluorocarbon chlorides and bromides have previously been prepared by other methods, but no previous single method has had the scope and flexibility of the present method in respect to permitting preparation of a broad range of fluorocarbon chlorides and bromides, including the monochlorides and monobromides. So far as we are aware, ours is the first successful method for preparing fluorocarbon bromides by replacement of hydrogen. A photochemical process of substitutive chlorination of fluorine-containing hydrocarbons has been known, but it is prohibitively slow in cases where only one hydrogen atom is available in each molecule, and is unsuitable for large scale use.

Our method makes possible the production of saturated fluorocarbon monobromides. This class includes the aliphatic fluorocarbon monobromides having the formula:

$$C_nF_{2n+1}Br$$

These novel compounds are made by replacing the hydrogen in the corresponding fluorocarbon monohydride. These compounds are stable to light and heat and are inert to ordinary reagents. In contrast, some dibromides tend to release bromine. As an illustration of the stability, a gaseous mixture of $CF_3Br$ and bromine was passed through a quartz tube maintained at 815° C. without substantial alteration.

The aliphatic fluorocarbon monobromides containing three or less carbon atoms are colorless gases which condense to colorless highly mobile liquids, and have boiling points as indicated in the following table (the ranges being those of purified samples containing traces of impurities which prevented measurement of highly exact values):

|  | Boiling point |
|---|---|
| $CF_3Br$ | −60.5 to −59.0° C. |
| $C_2F_5Br$ | −23.0 to −21.0° C. |
| $C_3F_7Br$ | 11.0 to 12.0° C. |

It will be noted that the boiling points are much higher than for the corresponding straight fluorocarbons (thus the boiling point of $CF_4$ is −128° C.). These gaseous compounds have utility as refrigerants and as low-boiling solvents. Because of their stability, the higher-boiling, normally liquid, members of the series have utility as solvents, dielectrics, hydraulic mechanism fluids, and heat transfer fluids, for example.

The monobromides are not, however, so chemically inert as the corresponding straight fluorocarbons consisting solely of carbon and fluorine. For example, $C_3F_7Br$ has been found to react with magnesium in the presence of ether to form a Grignard reagent, when extreme precautions were taken to remove traces of moisture. The formation of the Grignard reagent was demonstrated by its hydrolysis with water to form $C_3F_7H$. Such Grignard reagents are useful in chemical synthesis.

The bromine atom in fluorocarbon bromides is more chemically active than is the chlorine atom in the corresponding fluorocarbon chlorides. These compounds are useful in coupling and replacement reactions other than the Grignard. Hence it is expected that they will be useful in preparing many new compounds and will serve as intermediates for chemical synthesis in the preparation of dyes, drugs, insecticides, etc.

The following examples, based on actual experiments, further serve to illustrate the method.

EXAMPLE 1

The reaction tube consisted of a "Pyrex" glass tube having an internal diameter of 19 millimeters and a length of 30 centimeters, packed with short lengths of 6 millimeter "Pyrex" tubing to provide additional surface contact area. The tube was heated by an electric furnace and the temperature was maintained in the range of about 500 to 600° C.

The fluorocarbon hydride starting material was led from a storage tank through an electrically heated bubbler containing bromine, maintained at about 40 to 50° C., to provide an excess of bromine, and the gaseous mixture was led to the inlet end of the reaction tube. The flow rate of the fluorocarbon hydride was about 0.2 to 0.4 mol per hour. The outlet end of the reaction tube was connected to three traps connected in series; the first being cooled with ice, the second with a mixture of acetone and solid carbon dioxide, and the third with liquid air.

The condensate was allowed to warm slowly and the vapors were passed through a basic bisulfite solution to remove free bromine, then through concentrated sulfuric acid for drying, and was recondensed. Final purification was accomplished by distillation in a helix-packed fractionating column.

The fluorocarbon bromide products were identified by determination of boiling points at 740 mm., molecular weights by measurement of vapor density and application of the perfect gas law, and analysis of bromine content. The analytical method consisted of decomposition over hot sodium, solution of the residues, and the determination of the bromine by the Volhard method.

The following table shows identified fluorocarbon bromide reaction products obtained in this way from $CF_3H$, $C_2F_5H$, $C_3F_7H$ and $C_3F_6H_2$.

| Compound | B. P. (° C.) | Mol. Wt. | | Percent Bromine | |
|---|---|---|---|---|---|
|  |  | Found | Theor. | Found | Theor. |
| $CF_3Br$ | −60.5 to −59.0 | 149 | 149 | 53.4 | 53.7 |
| $C_2F_5Br$ | −23.0 to −21.0 | 201 | 199 | 39.7 | 40.2 |
| $C_3F_7Br$ | 11.0 to 12.0 | 248 | 249 | 31.8 | 32.1 |
| $C_3F_6Br_2$ | 71.0 to 71.5 | 308 | 310 | 51.1 | 51.6 |
| $C_3F_6HBr$ | 31.5 to 33.0 | 228 to 235 | 231 | 34.3 / H, 0.40 | 34.6 / 0.43 |

Yields of 80–90% were obtained.

EXAMPLE 2

Using apparatus of the type described in the preceding example, it was demonstrated that chlorination can likewise be accomplished. Several runs were made, at temperatures in the range of 500 to 600° C.

In one run, conducted at 500–530° C., 42 grams of $C_3F_7H$ and 27 grams of admixed chlorine were passed through the heated tube during a period of 95 minutes; and purification and fractionation of the product yielded 21 grams of material having a boiling range of −6.5 to 0° C. and a molecular weight of 202 to 211. This was identified as $C_3F_7Cl$ (theoretical molecular weight of 205). In other experiments similar products were obtained having boiling points of −2 to 0° C. and were likewise identified as $C_3F_7Cl$.

In another experiment 122 grams of a stock containing $C_3F_6H_2$ was used, the mol ratio of chlorine to fluorocarbon being about 2:1. Fractionation of the reaction product yielded a 35 gram fraction boiling at 32 to 35° C., which was identified as relatively pure $C_3F_6Cl_2$.

Preparation of $C_nF_{2n+1}H$ compounds

These aliphatic fluorocarbon monohydrides are needed as starting materials for the preparation of corresponding fluorocarbon monochlorides and monobromides by the present method. The lowest member of the series is fluoroform ($CF_3H$) which is well known. This and higher members of the series can be made from polycarbon fluorocarbons having the formula $C_nF_{2n+2}$, by the thermal hydrogenolysis method described and claimed in the application of Joseph H. Simons, et al., Ser. No. 738,506, filed of even date herewith (since issued as Patent No. 2,494,064 on January 10, 1950).

This hydrogenolysis method may be performed by passing a gaseous mixture of a suitable fluorocarbon and hydrogen through a reaction tube heated in a furnace to a temperature of the order of 800–900° C. An iron tube lined with Monel metal or graphite is suitable. Under such conditions cleavage of carbon-carbon bonds occurs and formation of carbon-hydrogen bonds results. Thus $CF_3H$ and $C_2F_5H$ can be made from $C_3F_8$, etc. The fluorocarbon monohydride product compounds can be separated; or in mixed form can be used directly in the present method, and the resultant chloride or bromide compounds can be separated, as by fractional distillation. Other saturated fluorocarbon monohydrides may be similarly prepared.

Having described various illustrative embodiments of our invention, what we claim is as follows:

1. A thermal replacement method of making fluorocarbon monochlorides and monobromides which comprises passing a gaseous mixture of a fluorocarbon monohydride, having the formula $C_nF_{2n+1}H$, and a halogen of the class consisting of chlorine and bromine, through a heated zone maintained at a high temperature of the order of 500–600° C. sufficient to cause thermal replacement of hydrogen but insufficient to cause substantial pyrolysis, and recovering a halogenated reaction product having the same number of carbon atoms.

2. A thermal replacement method of making fluorocarbon monochlorides having the formula $C_nF_{2n+1}Cl$, which comprises passing a gaseous mixture of chlorine and a fluorocarbon hydride, having the formula $C_nF_{2n+1}H$, through a heated tube maintained at a temperature of the order of 500–600° C., and recovering the fluorocarbon monochloride reaction product.

3. A thermal replacement method of making fluorocarbon monobromides having the formula $C_nF_{2n+1}Br$, which comprises passing a gaseous mixture of bromine and a fluorocarbon hydride, having the formula $C_nF_{2n+1}H$, through a heated tube maintained at a temperature of the order of 500–600° C., and recovering the fluorocarbon monobromide reaction product.

4. A thermal replacement method of chlorination and bromination of compounds of the class consisting of saturated fluorocarbon monohydrides and dihydrides and partially chlorinated and brominated derivatives thereof, wherein the molecule contains at least one replaceable hydrogen atom and the number of fluorine atoms exceeds the number of carbon atoms with at least one fluorine atom bonded to each carbon atom, including the steps of heating a gaseous mixture of a compound of the defined class and a halogen of the class consisting of chlorine and bromine, at a high temperature sufficient to cause thermal replacement of hydrogen by said halogen but insufficient to cause substantial pyrolysis, by passing the gaseous mixture through a heated tube maintained at a temperature of the order of 500–600° C., and recovering as a major product a halogenated reaction product having the same number of carbon atoms wherein hydrogen has been replaced by halogen.

5. The method which comprises passing through a heated tube maintained at a temperature of the order of 500–600° C., a gaseous mixture of a halogen of the class consisting of chlorine and bromine, and a saturated fluorocarbon hydride wherein the number of hydrogen atoms does not exceed two and the number of fluorine atoms exceeds the number of carbon atoms with at least one fluorine atom bonded to each carbon atom of the molecule, the mixture being heated at a high temperature sufficient to cause thermal replacement of hydrogen by said halogen but insufficient to cause substantial pyrolysis, and recovering as a major product a halogenated reaction product having the same number of carbon atoms wherein hydrogen has been replaced by halogen.

6. A thermal replacement method of making saturated aliphatic fluorocarbon chlorides and bromides, which comprises passing through a heated tube, maintained at a temperature of the order of 500–600° C., a gaseous mixture of a halogen of the class consisting of chlorine and bromine, and a saturated aliphatic fluorocarbon hydride wherein the number of hydrogen atoms in the molecule does not exceed two and the number of fluorine atoms exceeds the number of carbon atoms with at least one fluorine atom bonded to each carbon atom, and recovering a reaction product having the same number of carbon atoms and in which hydrogen has been replaced by chlorine or bromine.

7. A thermal replacement method of making saturated aliphatic polycarbon fluorocarbon chlorides, which comprises passing through a heated tube, maintained at a temperature of the order of 500–600° C., a gaseous mixture of chlorine and a saturated aliphatic polycarbon fluorocarbon hydride wherein the number of hydrogen atoms in the molecule does not exceed two and at least one fluorine atom is bonded to each carbon atom, and recovering a fluorocarbon chloride reaction product having the same number of carbon atoms.

8. A thermal replacement method of making saturated aliphatic polycarbon fluorocarbon bromides, which comprises passing through a heated tube, maintained at a temperature of the order of 500–600° C., a gaseous mixture of bromine and a saturated aliphatic polycarbon fluorocarbon hydride wherein the number of hydrogen atoms in the molecule does not exceed two and at least one fluorine atom is bonded to each carbon atom, and recovering a fluorocarbon bromide reaction product having the same number of carbon atoms.

9. A method of making $CF_3Br$ which comprises passing a gaseous mixture of bromine and fluoroform through a heated tube maintained at a temperature of the order of 500–600° C. so as to effect bromination of the fluoroform and produce $CF_3Br$ in a high yield, and recovering the latter.

JOSEPH H. SIMONS.
THOMAS J. BRICE.
WILBUR H. PEARLSON.

References Cited in the file of this patent

UNITED STATES PATENTS

| Number | Name | Date |
|---|---|---|
| 2,004,072 | Hass et al. | June 4, 1935 |
| 2,334,033 | Riblett | Nov. 9, 1943 |
| 2,404,374 | Harmon | July 23, 1946 |
| 2,407,246 | Benning et al. | Sept. 10, 1946 |
| 2,413,696 | Downing et al. | Jan. 7, 1947 |
| 2,417,059 | Calfee et al. | Mar. 11, 1947 |
| 2,436,135 | Barrick et al. | Feb. 17, 1948 |
| 2,506,652 | Simons et al. | May 9, 1950 |
| 2,531,372 | Waterman | Nov. 21, 1950 |

OTHER REFERENCES

Henne, Jour. Am. Chem. Soc., vol. 59, pages 1200–1 (1937).

McBee et al., Jour. Am. Chem. Soc., vol. 62, pages 3340–1 (1940).

Henne et al., Jour. Am. Chem. Soc., vol. 64, pp. 1157–9 (1942).

Henne, Organic Reactions, vol. 11, pub. by Wiley and Sons, Inc., New York (1944), pages 76–79.